(12) United States Patent
Bezalel

(10) Patent No.: US 11,979,338 B2
(45) Date of Patent: May 7, 2024

(54) SYSTEM AND METHOD FOR CELLULAR NETWORK DATA STORAGE AND FORWARDING

(71) Applicant: Flo Live Israel LTD., Bnei Brak (IL)

(72) Inventor: Shmulik Bezalel, Kfar Vradim (IL)

(73) Assignee: FLO LIVE ISRAEL LTD., Bnei Brak (IL)

( * ) Notice: Subject to any disclaimer, the term of this patent is extended or adjusted under 35 U.S.C. 154(b) by 0 days.

(21) Appl. No.: 17/504,954

(22) Filed: Oct. 19, 2021

(65) Prior Publication Data

US 2022/0131815 A1 Apr. 28, 2022

Related U.S. Application Data

(60) Provisional application No. 63/106,560, filed on Oct. 28, 2020.

(51) Int. Cl.
*H04L 49/25* (2022.01)
*H04L 67/12* (2022.01)
*H04L 67/568* (2022.01)
*H04W 28/02* (2009.01)

(52) U.S. Cl.
CPC .......... *H04L 49/252* (2013.01); *H04L 67/568* (2022.05); *H04W 28/0215* (2013.01); *H04L 67/12* (2013.01)

(58) Field of Classification Search
CPC ..... H04L 49/252; H04L 67/568; H04L 67/12; H04W 28/0215; H04W 4/70; H04W 52/0209; Y02D 30/70
See application file for complete search history.

(56) References Cited

U.S. PATENT DOCUMENTS

| 2012/0155324 | A1* | 6/2012 | Janakiraman | H04W 24/08 370/254 |
| 2016/0174148 | A1* | 6/2016 | Seed | H04W 40/005 370/311 |
| 2018/0159940 | A1* | 6/2018 | Hultkrantz | H04L 67/02 |
| 2021/0084097 | A1* | 3/2021 | Whitcher | G06F 40/14 |

* cited by examiner

*Primary Examiner* — Charles C Jiang
*Assistant Examiner* — Shawn D Miller
(74) *Attorney, Agent, or Firm* — M&B IP Analysts, LLC

(57) ABSTRACT

A method and system for cellular network data storage and forwarding are provided. The method includes receiving storage-and-forward data from an application server, wherein the storage-and-forward data is directed to a device connected in a cellular network, wherein the device operates in at least a sleep state and a wakeup state; caching the received storage-and-forward data in a memory; checking if the device is currently in the wakeup state; and forwarding the cached storage-and-forward data to the device when the device is in the wakeup state.

17 Claims, 4 Drawing Sheets

SYSTEM AND METHOD FOR CELLULAR NETWORK DATA STORAGE AND FORWARDING

CROSS-REFERENCE TO RELATED APPLICATIONS

This application claims the benefit of U.S. Provisional Application No. 63/106,560, filed on Oct. 28, 2020, the contents of which are hereby incorporated by reference

TECHNICAL FIELD

The present disclosure relates generally to mobile network operations and, particularly, to store & forward (S&F) mechanisms for 3G and 4G networks.

BACKGROUND

Recently, Internet-of-Things (IoT) devices have become increasingly popular among tech manufacturers, as well as with consumers. IoT devices include physical devices and everyday objects that are configured to connect to a network, such as the Internet, allowing the devices to perform advanced functions using network connectivity. IoT devices may include an array of appliances, ranging from refrigerators and microwaves to security cameras and thermostats. Many such devices are designed to be connected to home or work wireless internet networks, using a wireless router or access point to connect to the Internet. This setup is often convenient and cost-friendly, as many IoT devices are used within the range of a standard network.

Certain devices, particularly those powered by batteries, may employ specific techniques to conserve power and extend device service life. Battery-operated devices may be useful where wired power is unavailable, such as in remote locations, locations under construction, and the like, as well as for devices, such as cell phones, which are mobile by design. Such devices may be configured to conserve battery power by entering into low-power "sleep" states when not in active use, reducing power consumption by throttling device activity or performance. Where a device enters into such a sleep state, the device may be unavailable to remote servers and networks, such as local Wi-Fi and cellular long-term evolution (LTE) networks. Availability to such networks may be critical in providing data to the device or devices, reducing the ability of devices in sleep states to receive incoming messages, such as calls or data packets, to alert central servers of device statuses, and to receive critical device updates. As a result, while sleep states may provide for certain power savings, the same states may reduce the functionality and connectivity of sleeping devices.

Store-and-forward (S&F) solutions provide for the transmission of data to sleeping devices by holding the data intended for a target device at a sending or intermediary server, until such a time as the target device is awake and available to receive the held data. Various S&F solutions provide for the delivery of data to sleeping devices but fail to provide for the broad applicability necessary to quickly and easily integrate new devices and communications into a network. Current S&F solutions may be protocol-specific, limiting the applicability of the S&F solutions to networks and devices employing particular protocols. Further, current S&F solutions may fail to provide for the transmission of encrypted data without decrypting such data, reducing the security of forwarded messages. In addition, current S&F solutions may fail to provide for notification of central servers as to the success of data delivery, in addition to any receipt confirmation messages received from the target device. For example, when a central server is required to push firmware update to the devices, there is no way for the server to know if a device is currently available or in sleep mode. The existing S&F solutions can solve these problems.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cellular network data storage and forwarding. The method comprises receiving storage-and-forward data from an application server, wherein the storage-and-forward data is directed to a device connected within a cellular network, wherein the device operates in at least a sleep state and a wakeup state; caching the received storage-and-forward data in a memory; checking if the device is currently in the wakeup state; and forwarding the cached storage-and-forward data to the device when the device is in the wakeup state.

Certain embodiments disclosed herein also include a non-transitory computer readable medium having stored thereon causing a processing circuitry to execute a process, the process comprising: receiving storage-and-forward data from an application server, wherein the storage-and-forward data is directed to a device connected within a cellular network, wherein the device operates in at least a sleep state and a wakeup state; caching the received storage-and-forward data in a memory; checking if the device is currently in the wakeup state; and forwarding the cached storage-and-forward data to the device when the device is in the wakeup state.

Certain embodiments disclosed herein also include a system for cellular network data storage and forwarding. The system comprises: a processing circuitry; and a memory, the memory containing instructions that, when executed by the processing circuitry, configure the system to: receive storage-and-forward data from an application server, wherein the storage-and-forward data is directed to a device connected within a cellular network, wherein the device operates in at least a sleep state and a wakeup state; cache the received storage-and-forward data in a memory; check if the device is currently in the wakeup state; and forward the cached storage-and-forward data to the device when the device is in the wakeup state.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
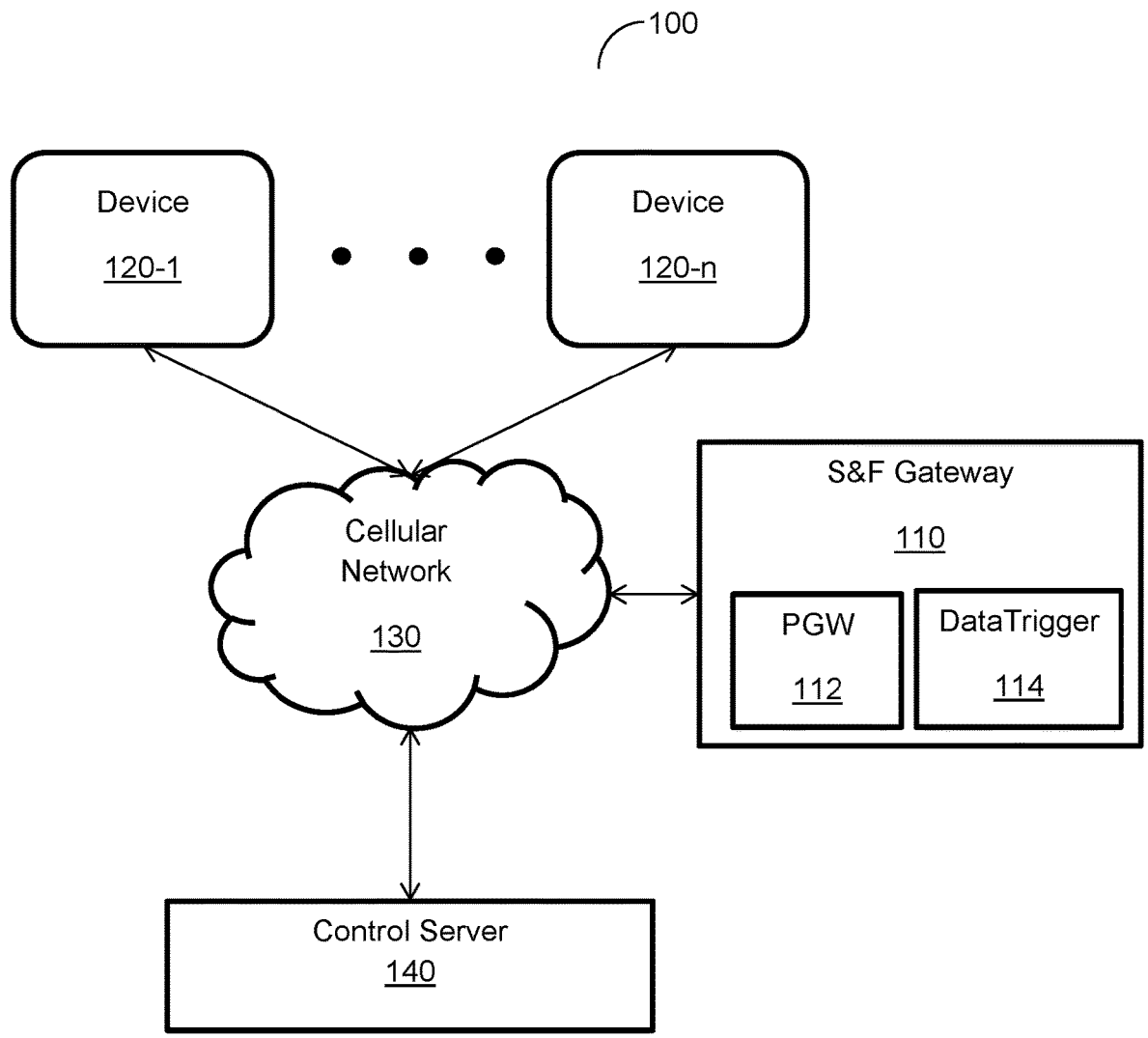
FIG. 1 is a block diagram showing a simplified network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a block diagram 100 showing a simplified network diagram utilized to describe the various embodiments. The network depicted includes a store and forward (S&F) gateway 110, a control server 140, and a plurality of devices, 120-1 through 120-n (hereinafter, "devices" 120 or "device 120), interconnected through a cellular network 130. The S&F gateway 110 may be configured to include a packet data network gateway (PGW) 112, and a data trigger engine 114, both of which are described in detail hereinbelow.

The devices 120 are mobile devices of one or more types, configured for connection with the S&F gateway 110 for purposes including, without limitation, exchanging data, sending or receiving commands or instructions, and the like, as well as any combination thereof. Examples of devices 120 include, without limitation, cell phones, tablet computers, internet of things (IoT) devices, wearable devices, and the like. Devices 120 may be configured to connect to the S&F gateway 110 via one or more means including, without limitation, Wi-Fi, long-term evolution (LTE), Bluetooth®, and the like, as well as any combination thereof.

The devices 120 may be configured to enter a "sleep" mode when not in active use, providing for improvements to device 120 battery life. During a sleep mode of a device 120, the device 120 may be configured to periodically execute a "wake-up" routine. Such a routing provides for transmission of device 120 data to the control server 140, the S&F gateway 110, and other, like, components of a network system, such as that of FIG. 1 during the "wake-up" period. The "wake-up" period may be a pre-defined or user-defined time interval wherein the device 120 may be configured to execute a "wake-up" routine. A "wake-up" period may be, for example, a period of 100 milliseconds, occurring once every ten minutes, providing for device 120 battery savings by maintaining a "sleep" state when the device 120 is not in active use.

The S&F gateway 110 is a computing resource configured to connect to and manage the store and forward functionality for one or more devices 120. The S&F gateway 110 may be configured as a single, physical hardware unit, as multiple variously-connected hardware units, as one or more virtual or cloud devices, and the like, as well as any combination thereof. The S&F gateway 110 may be configured to include one or more engines, including, without limitation, the PGW 112, the data trigger engine 114, other, like, engines, and any combination thereof. In an embodiment, the PGW 112, the data trigger engine 114, and the like, may be separate from the S&F gateway 110 and may be disposed at various locations within the network and connected to the various components described herein to execute, without limitation, one or more of the functions described below. The S&F gateway 110, is described in greater detail with respect to FIG. 4, below.

The S&F gateway 110 may be configured to provide for store and forward (S&F) functionalities, including receipt of messages and destined for destination devices, as well as messages received from network sources including, without limitation, the control server 140, storage of data features and messages intended for a destination device 120, forwarding of such data features and messages during a device's "wake-up" period, and the like, as well as any combination thereof. In an embodiment, the S&F gateway 110 may be configured to provide S&F functionality in a protocol-agnostic fashion, providing S&F functionalities across one or more protocols. In an additional embodiment, the S&F gateway 110 may be configured to provide S&F functionality with various degrees of data encryption, including configurations providing S&F functionality without decrypting stored and forwarded data.

In a further embodiment, the S&F gateway 110 may be configured to notify one or more backend application servers (not shown), which may be included in, or separate from, the S&F gateway 110, with data delivery information, device response information, and the like. The S&F gateway 110 may be configured to execute one or more of the methods described herein, including, without limitation, the method of FIG. 3, below.

The PGW 112 is an engine providing for connectivity between devices 120, connected to the S&F gateway 110, via the cellular network 130, and various external networks including, without limitation, the internet, various mobile networks, and the like, as well as any combination thereof. The PGW 112 may further provide for the execution of functions related to, as examples and without limitation, policy enforcement, packet filtering, and the like, as well as any combination thereof. Where the S&F gateway 110 receives a data feature for storage and forwarding to a device 120, the PGW 112 may be configured to record a data trigger engine 114 notification request, in response to which data trigger engine 114 notification request the PGW 112 may, upon initiation of a destination device 120 "wake-up" process, send a notification to the data trigger engine 114. In addition, where a device 120 initiates a "wake-up" process, the PGW 112 may be configured to route one or more data features to the device 120 and cause the data trigger engine 114 to process one or more stored data features.

The data trigger engine 114 in a S&F gateway 110 is configured to support S&F gateway 110 S&F functionality. The data trigger engine 114 may be configured to receive, from a backend application server, as described hereinabove, a data feature for storage and forwarding to a destination device 120. As described above, upon receipt of a data feature for storage and forwarding, the data trigger engine 114 may be configured to register a data trigger engine 114 notification request with the PGW 112, providing for notification of the data trigger engine 114 when the device 120 initiates a "wake-up" process. Further, where the data trigger engine 114 receives a "wake-up" notification, the data trigger engine 114 may be configured to transmit one or more stored data features to the destination device 120, and to notify the backend application server with a confirmation, where the confirmation may include confirmation that the data feature or features were sent to the device 120, that a response was received from the device 120, or both. Execution of a data store and forward process is described in detail with respect to FIG. 2, below.

The various engines described hereinabove may be implemented as one or more processing circuitries such as, as examples and without limitation, field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The cellular network 130 is a network configured to provide connectivity between one or more components of a network system including, without limitation, the devices 120, the S&F gateway 110, the control server 140, and the like, as well as any combination thereof. The cellular network 130 may be configured to provide connectivity via one or more means including, without limitation, cellular connections, such as third-generation cellular connections (3G), long-term evolution (LTE) connections, and the like, as well as other, like, means, and any combination thereof. Further, connections between the various components of the network system, via the cellular network, may be configured to provide for the transmission of data compressed to varying degrees, encrypted to varying degrees, or both.

The control server 140 is a server providing for coordination of the various components of the network system, as well as the processes and protocols by which such components interact. The control server 140 may be configured to execute one or more functions including, without limitation, transmitting messages to the S&F gateway 110, via the cellular network 130, for storage and forwarding as described herein, monitoring the status of network components, orchestrating data transmission orders and timing, other, like, functions, and any combination thereof. The control server 140 may be one or more physical devices or components, one or more virtual devices or components, and any combination thereof. An example of a control server, by way of analogy, may be a stoplight coordination system, which may provide for control of a town's stoplights to provide for optimal flow of traffic, and reduction of congestion.

Figure 2:
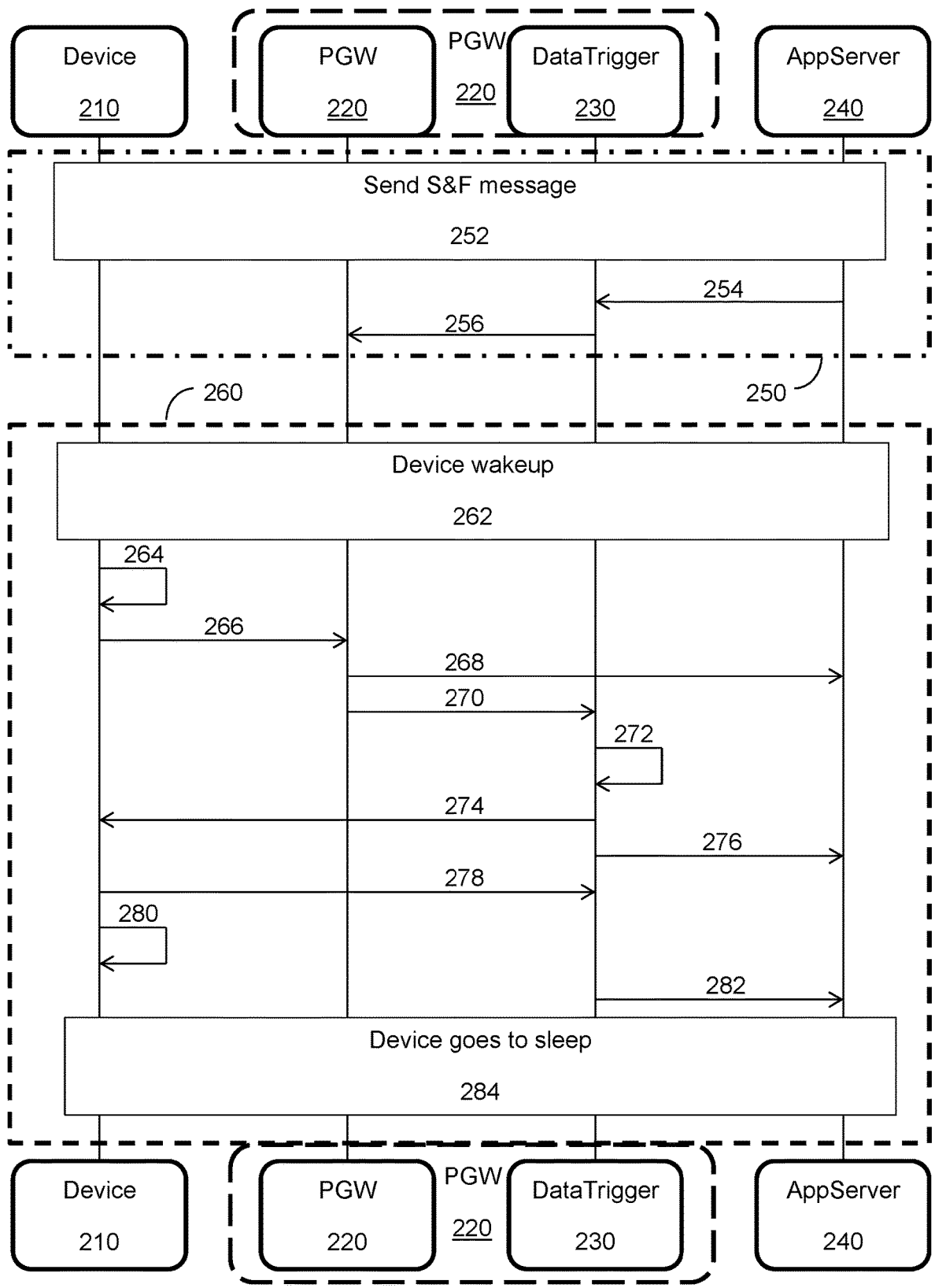
FIG. 2 is a flow diagram depicting a process for mobile network data storage and forwarding, according to an embodiment.

FIG. 2 is an example flow diagram 200 depicting a process for mobile network data storage and forwarding (S&F), according to an embodiment. The process is divided into two stages, a first store and forward stage 250 and a transmission stage 260. It may be understood that one or more of the processes included in each stage may be executed in orders other than the order depicted in the flow diagram 200, including simultaneous execution, without loss of generality or departure from the scope of the disclosure.

It may be understood that the device 210, PGW 220, the data trigger 230, and the application server 240 may be components similar or identical to, respectively, the devices, 120, PGW, 112, the data trigger engine 114, and the S&F gateway, 110, of FIG. 1, above, without loss of generality or departure from the scope of the disclosure. Further, the PGW 220 and the data trigger 230 may be components of a S&F gateway, such as the S&F gateway, 110, of FIG. 1, above.

In the store and forward stage 250, various components of the network system are configured for such storage and forwarding, and a message, or another, like, data feature, is stored and forwarded thereby. At 252, an S&F message, or another, like, data feature, is sent. An S&F message may be sent from one or more sources including, without limitation, the application server 240, an external source or server, such as a mobile network provider, and the like, as well as any combination thereof. An S&F message may include, as examples and without limitation, one or more data features relevant to user requests, network updates, incoming messages, and the like, and any combination thereof.

At 254, a "set trigger" command is sent from the application server 240 to the data trigger engine 230. The "set trigger" command may include data features relevant to, without limitation, a trigger identifier (ID), relevant to trigger update and clear functionalities, an optional trigger expiration feature, a device ID describing the target device according to one or more attributes including, without limitation, device integrated circuit card identifier (ICCID), device international mobile subscriber identity (IMSI), a Mobile Station International Subscriber Directory Number (MSISDN), and the like, as well as any combination thereof, and one or more trigger filter data features, relevant to filtering based on the source internet protocol (IP) address, destination IP address, destination and source ports, protocols, and the like, as well as any combination thereof. Further, in addition to those features described, the "set trigger" command sent at 254 may also include data features such as, as examples and without limitation, data payloads, specific, optional, destination IP addresses, device port identifiers, confirmation callback specifications, and the like, as well as any combination thereof. Confirmation callbacks may include one or more callback uniform resource locators (URLs), supporting callbacks including, without limitation, "confirmation of send" callbacks, "confirmation of receipt" callbacks, and the like, as well as any combination thereof.

At 256, a subscribe command is sent from the data trigger engine 230 to the PGW 220. The subscribe command may include data features specifying, without limitation, destination device identifiers, including ICCID and IMSI, trigger filter data, as included in the "set trigger" command sent at 254, and the like, as well as any combination thereof.

In the transmission stage 260, data is exchanged between the device 210 and the various other components described. At 262, device wakeup, as described hereinabove, is executed, with the device 210 persisting in a "wake-up" state from 264 through 280, where the device resumes the "sleep" state.

At 266, once the device wakes up, a communication channel is established between the device 210 and the PWG 220. In some configurations, device data may be sent from the device 210 to the PGW 220. The same device data may be sent at 268, from the PGW 220 to the application server 240. Device data may include, without limitation, MQTT protocol data, other, like, data features, and any combination thereof. Further, at 270, the PGW 220 may send a notification to the data trigger engine 230, as described hereinabove, where the notification may include an identifier of the device 210, indicating that the device 210 is ready to receive any stored data. As noted above, device's 210 identification may include a device IMSI and an ICCID, a MSISDN, a source IP address and port, a communication protocol's type, and the like, as well as any combination thereof.

At 272, the data trigger engine 230 is configured to execute a data lookup process, wherein the data lookup process may include searching one or more memory or storage components of the data trigger engine 230, or those memory or storage components of the host device in which the engine is included, for data features stored for forwarding to the device 210. Data features stored for forwarding to the device 210 may be identified based on one or more device identifiers including, without limitation, ICCID, ISMI, and the like, as well as any combination thereof.

At 274, following the data lookup process, the data trigger engine 230 sent to the device 210, the cached data at PWG 220. The transmission of data 274 is performed through the PGW 220.

At 276, the data trigger engine 230 sends the application server 240 a callback confirming that the received data (at 254) has been sent to the device 210 and, at 278, the device 210 sends a response to the data trigger engine 230, acknowledging the receipt of the message at 274. Subsequently, at 280, the device initiates a "sleep" process as described hereinabove. At 282, the data trigger engine 230 sends the application server 240 a confirmation callback, confirming that the device 210 has received the message. At 284, the device 210 is in a "sleep" state, which persists until the next "wake-up" process is initiated.

Figure 3:
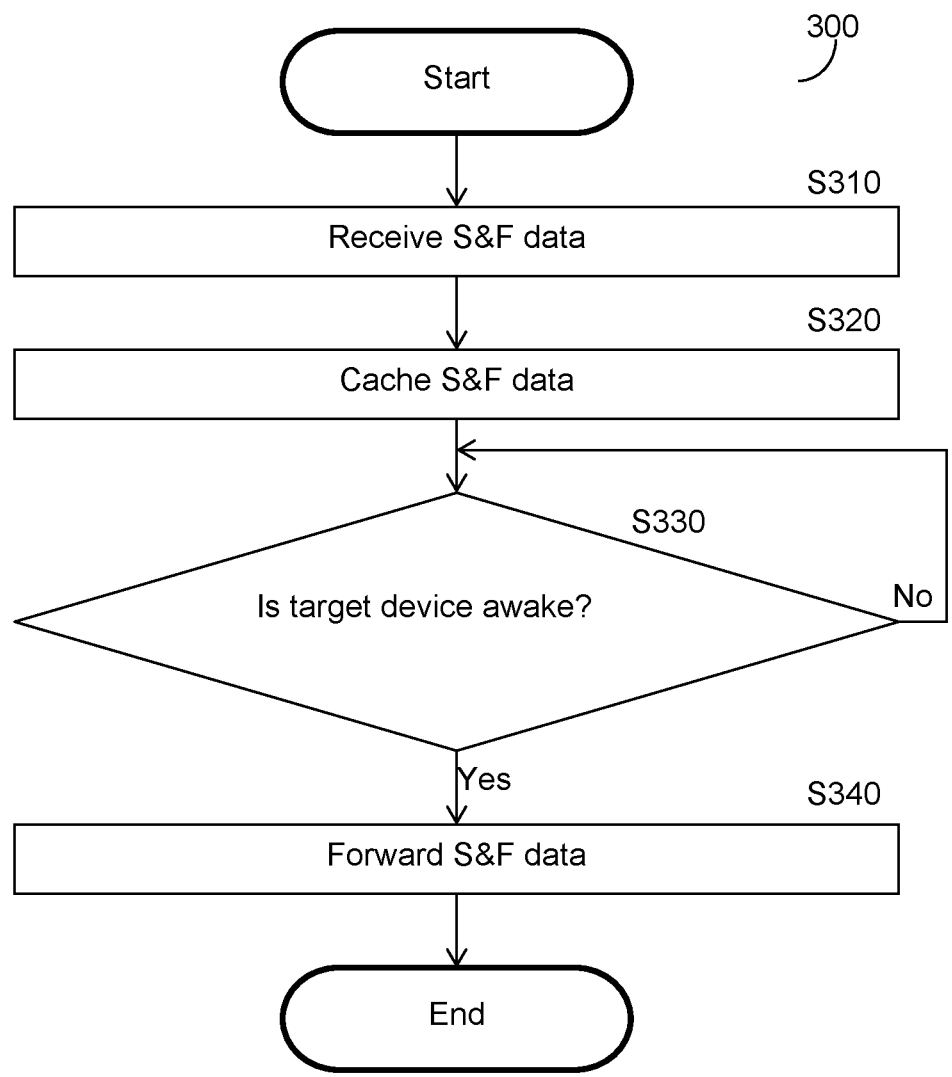
FIG. 3 is a flowchart illustrating a process for server execution of a store-and-forward (S&F) routine, according to an embodiment.

FIG. 3 is an example flowchart 300 illustrating a process for a store-and-forward (S&F) routine, according to an embodiment. The process described with respect to the flowchart 300 may be executed by a S&F gateway similar or identical to those described hereinabove, where such a S&F gateway may include, without limitation, a PGW, a data trigger engine, and the like, as well as any combination thereof, where such included components may be similar or identical to those described hereinabove.

At S310, S&F data is received from an application server. S&F data is data to be sent to a target device, where such a target device may be configured in various states including, without limitation, awake, asleep, powered-off, and the like. Target devices may be various devices such as, as examples and without limitation, mobile phones, tablet computers, internet of things (IoT) devices, and the like. S&F data may include, without limitation, data requested by a target device, device firmware or software updates, device status queries, target device identifiers, and the like, as well as any combination thereof. S&F data may be received from one or more sources including, without limitation, the various components and sub-components of the network system described with respect to FIG. 1, above, other, like, sources, and any combination thereof, via one or more means including, without limitation, wired connections, wireless connections, and any combination thereof. S&F data, as received at S310, may be encrypted to various degrees, compressed to various degrees, or both.

Further, receiving S&F data at S310 may include receiving one or more commands or instructions, where such commands or instructions may, when executed by the PGW, configure the PGW to send one or more "receipt" or "acknowledgement" messages to the source from which S&F data is received, including "receipt" or "acknowledgement" messages generated, sent, or both, by the PGW during various stages of the process described with respect to FIG. 3. In an embodiment, receiving S&F data at S310 may further include collecting S&F data from one or more sources described herein by one or more means including, without limitation, execution of various S&F data collection protocols.

At S320, S&F data is cached. S&F data may be cached by storing one or more S&F data features, as received at S310, to various memory or storage components. The memory or storage components to which S&F data may be cached may be memory or storage components included in or connected to the data trigger engine included in a server, memory or storage components included in or connected to the various components of a network system, such as the network system described with respect to FIG. 1, above, other, like, memory or storage components, and any combination thereof.

Caching of S&F data at S320 may further include labeling, tagging, or otherwise associating the cached S&F data with various data descriptors. The data descriptors may include data features relevant to the execution of an S&F process, including, without limitation, target device identifiers, S&F schedules, lists of devices, and the like, as well as any combination thereof. As at S320, S&F data cached at S320 may be encrypted to various degrees, compressed to various degrees, or both, including compression and encryption by the data trigger engine, the storage and memory components, and the like.

At S330, it is determined whether the target device is awake. Whether the target device is awake may be determined by one or more means including, without limitation, polling or querying the target devices, polling or querying all devices connected to a data trigger engine included in the server, analyzing one or more lists, tables, or other, like, device status data features, where such device status data features may include, for example, and without limitation, device status timetables, and the like, as well as other, like, means, and any combination thereof.

Where, at S330, it is determined that the target device is awake, execution continues with S340. In addition, where, at S330, it is determined that the target device is awake, a PGW may be configured to send, to a data trigger engine, a "wake-up" notification for the target device, the "wake-up" notification indicating that the status of the target device has changed to "awake." Further, such a transmission of a "wake-up" notification may be in response to the execution of a "subscribe" function by the same data trigger engine, as is described hereinbelow.

Where, at S330, it is determined that the target device is not awake, execution continues with S330, repeating until it is determined that the target device is awake. Further, where, at S330, it is determined that the target device is not awake, the data trigger engine may execute a "subscribe" function, providing for subscription of the data trigger engine to a register of device statuses, as may be included in a PGW, or other, like, components, where a "subscribe" function may include an instruction specifying that the PGW issued a notification to the data trigger engine when the target device status changes to "awake."

At S340, S&F data is forwarded to the target device. S&F data may be forwarded to the target device over the cellular network. S&F data may be forwarded according to one or more schedules, time charts, or other, like, forwarding schemes, where such schedules, time charts, and other, like, forwarding schemes may specify, as examples and without limitation, S&F data forwarding orders, timing, protocols, and the like, as well as any combination thereof. In addition, S&F data forwarding at S340 may include generating, transmitting, or both generating and transmitting, a trigger command, where such a trigger command may, when executed by the component from which the S&F data was received at S310, configure such a component to process one or more stored messages or S&F data features, to issue confirmation messages, and the like, as well as any combination thereof.

Figure 4:
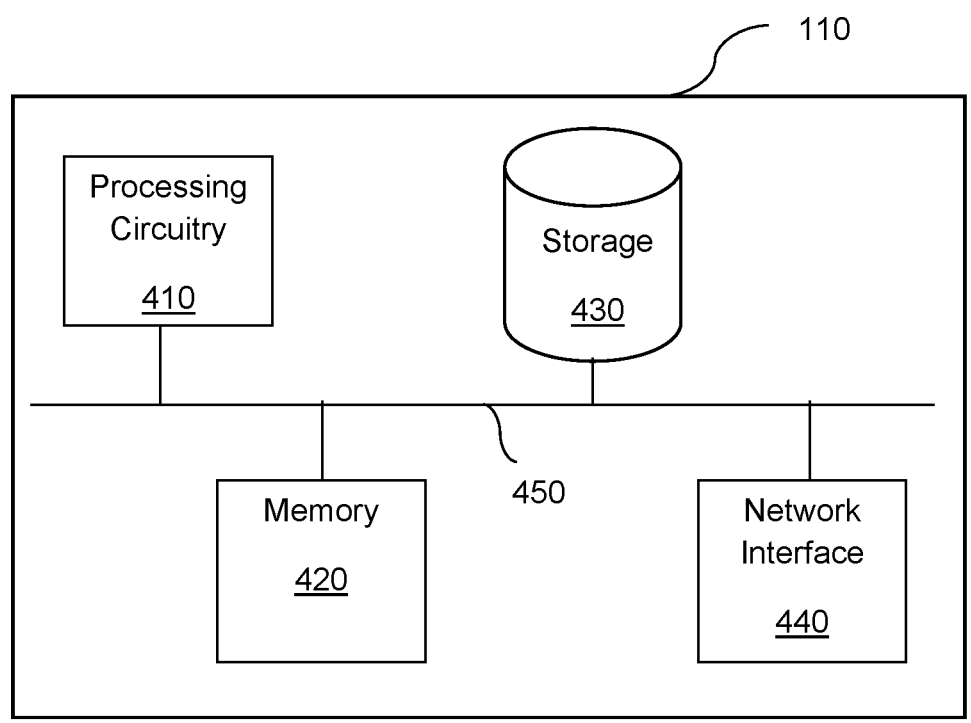
FIG. 4 is an example schematic diagram of a server, according to an embodiment.

FIG. 4 is an example schematic diagram 400 of a S&F gateway 110, according to an embodiment. The S&F gateway 110 includes a processing circuitry 410 coupled to a memory 420, a storage 430, and a network interface 440. In an embodiment, the components of the server 430 may be communicatively connected via a bus 450. In addition, the descriptions provided with respect to FIG. 4 may be likewise applicable to describe a PGW, such as the PGW, 112, of FIG. 1, above, a data trigger engine, such as the data trigger engine, 114, of FIG. 1, above, without loss of generality or departure from the scope of the disclosure.

The processing circuitry 410 may be realized as one or more hardware logic components and circuits. For example, and without limitation, illustrative types of hardware logic components can be used, such as field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, the software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the gateway 110 to communicate with the various components, devices, and systems described herein for mobile network data storage and forwarding, and for other, related, purposes.

It should be understood that the embodiments described herein are not limited to the specific architecture illustrated in FIG. 4, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for cellular network data storage and forwarding, comprising:
    receiving storage-and-forward data from an application server, wherein the storage-and-forward data is directed to a device connected within a cellular network, wherein the device operates in at least a sleep state and a wakeup state;
    caching the received storage-and-forward data in a memory;
    checking if the device is currently in the wakeup state; and
    forwarding the cached storage-and-forward data to the device when the device is in the wakeup state; and
    when the device is currently in a sleep state:
        waiting for the device to enter the wakeup state;
        retrieving the cached storage-and-forward data from the memory using a unique identifier of the device; and
        forwarding the retrieved storage-and-forward data to the device when the device transits to the wakeup state.

2. The method of claim 1, wherein the received storage-and-forward data includes at least data for configuration and provision of the device.

3. The method of claim 1, wherein the device is at least an internet of things (IoT) controlled by the application server.

4. The method of claim 1, further comprising:
sending an acknowledgement to the application server, thereby freeing the application server to perform different tasks.

5. The method of claim 1, wherein caching the received storage-and-forward data further comprises:
associating the cached storage-and-forward data with a unique identifier of the device.

6. The method of claim 5, wherein the unique identifier is any one of: a device integrated circuit card identifier (ICCID), a device international mobile subscriber identity (IMSI), and a mobile station international subscriber directory number (MSISDN).

7. The method of claim 1, wherein waiting for the device to enter the wakeup state further comprises:
receiving a message from the device that the device is awake.

8. The method of claim 1, wherein forwarding the storage-and-forward data to the device further comprises:
transmitting the storage-and-forward data over the cellular network.

9. A non-transitory computer readable medium having stored thereon instructions for causing a processing circuitry to execute a process, the process comprising:
receiving storage-and-forward data from an application server, wherein the storage-and-forward data is directed to a device connected within a cellular network, wherein the device operates in at least a sleep state and a wakeup state;
caching the received storage-and-forward data in a memory;
checking if the device is currently in the wakeup state; and
forwarding the cached storage-and-forward data to the device when the device is in the wakeup state; and
when the device is currently in a sleep state:
waiting for the device to enter the wakeup state;
retrieving the cached storage-and-forward data from the memory using a unique identifier of the device; and
forwarding the retrieved storage-and-forward data to the device when the device transits to the wakeup state.

10. A system for cellular network data storage and forwarding, comprises:
a processing circuitry; and
a memory, the memory containing instructions that, when executed by the processing circuitry, configure the system to:
receive storage-and-forward data from an application server, wherein the storage-and-forward data is directed to a device connected within a cellular network, wherein the device operates in at least a sleep state and a wakeup state;
cache the received storage-and-forward data in a memory;
check if the device is currently in the wakeup state; and
forward the cached storage-and-forward data to the device when the device is in the wakeup state; and
when the device is currently in a sleep state:
wait for the device to enter the wakeup state;
retrieve the cached storage-and-forward data from the memory using a unique identifier of the device; and
forward the retrieved storage-and-forward data to the device when the device transits to the wakeup state.

11. The system of claim 10, wherein the received storage-and-forward data includes at least data for configuration and provision of the device.

12. The system of claim 11, wherein the device is at least an internet of things (IoT) controlled by the application server.

13. The system of claim 10, wherein the system is further configured to:
send an acknowledgement to the application server, thereby freeing the application server to perform different tasks.

14. The system of claim 13, wherein the system is further configured to:
associate the cached storage-and-forward data with a unique identifier of the device.

15. The system of claim 14, wherein the unique identifier is any one of: a device integrated circuit card identifier (ICCID), a device international mobile subscriber identity (IMSI), and a mobile station international subscriber directory number (MSISDN).

16. The system of claim 10, wherein the system is further configured to:
receive a message from the device that the device is awake.

17. The system of claim 16, wherein the system is further configured to:
transmit the storage-and-forward data over the cellular network.

* * * * *